United States Patent [19]
Bacci et al.

[11] Patent Number: 4,575,259
[45] Date of Patent: Mar. 11, 1986

[54] OPTICAL FIBRE THERMOMETER

[75] Inventors: Mauro Bacci, Florence; Massimo Brenci, Pistoia; Giuliano Conforti, Florence; Riccardo Falciai, Florence; Anna G. Mignani, Florence; Anna M. Verga-Scheggi, Florence, all of Italy

[73] Assignee: Consiglio Nazionale Delle Ricerche, Italy

[21] Appl. No.: 661,395

[22] Filed: Oct. 16, 1984

[30] Foreign Application Priority Data

Oct. 18, 1983 [IT] Italy ............................... 19540 A/83

[51] Int. Cl.[4] .............................................. G01J 5/58
[52] U.S. Cl. .................... 374/130; 374/131; 374/161
[58] Field of Search .............. 374/129, 130, 131, 159, 374/161; 356/44, 43, 45; 250/368

[56] References Cited

U.S. PATENT DOCUMENTS

| 4,016,761 | 4/1977 | Rozzell et al. | 374/161 |
| 4,149,852 | 4/1979 | Tiru et al. | 374/162 |
| 4,176,552 | 12/1979 | Hammer | 374/161 |
| 4,261,651 | 4/1981 | Gray et al. | 374/162 |
| 4,278,349 | 7/1981 | Sander | 356/44 |
| 4,362,645 | 12/1982 | Hof et al. | 116/207 |
| 4,367,040 | 1/1983 | Goto | 374/131 |
| 4,376,890 | 3/1983 | Engstrom et al. | 374/130 |
| 4,448,547 | 5/1984 | Wickersheim | 374/131 |

FOREIGN PATENT DOCUMENTS

| 14729 | 1/1982 | Japan | 374/161 |
| 173732 | 10/1982 | Japan | 374/130 |
| WO82/01588 | 5/1982 | PCT Int'l Appl. | 374/161 |
| 2067288 | 7/1981 | United Kingdom | 374/129 |
| 922539 | 4/1982 | U.S.S.R. | 374/161 |

Primary Examiner—Charles Frankfort
Assistant Examiner—Thomas B. Will
Attorney, Agent, or Firm—McGlew and Tuttle

[57] ABSTRACT

An optical fiber temperature thermometer uses a thermochromic substance having optical absorption peaks which vary with temperature within a first waveband, and having substantially constant absorption with temperature in a second waveband. The radiation employed is in a wide band to include the first and second wavebands, and the radiation, reflected and attenuated as a result of the passage through the thermochromic substance, is split into two selected beams and filtered in narrow band pass filters for the first and second wavebands, to supply optical signals to respective detectors whose outputs are divided to produce a ratio signal representative of the temperature. The sensor is sufficiently compact for biomedical use, and, being unaffected by electromagnetic fields, is useful in regions of high tension or in microwave heating.

9 Claims, 5 Drawing Figures

OPTICAL FIBRE THERMOMETER

BACKGROUND OF THE INVENTION (1) Field of the Invention

The present invention relates to an optical-fibre thermometer, and to a method of measuring temperature using a probe.

(2) Description of the Prior Art

Optical-fiber thermometers with temperature sensors based on various principles have already been proposed. Thermometers of this type lend themselves particularly to remote measuring in hostile or difficult-access surroundings. Compared with more conventional devices, such as thermistors, thermocouples and the like, they have the advantage of being completely enclosed in a dielectric material, and as such are insensitive to electro-magnetic fields. This is found to be necessary for example for taking measurements in appliances subject to high tension (lines, transformers and other appliances) or in particular applications in which use is made of microwave heating, such as industrial applications, biomedical applications (hyperthermia), and so on.

SUMMARY OF THE INVENTION

It is an object of the present invention to provide an optic fiber thermometer which has sensitivity, whose heat-sensitive material is stable with time, which lacks hysteresis, and is not adversely affected by any fluctuations in the optical characteristics of parts of the thermometer external to the sensor and probe, especially the light source.

The invention consists in an optical fiber thermometer having an end probe and an optical fiber for conveying light from a source to the end probe and thence to electro-optical means for detecting temperature, characterized in that the end probe contains a thermochromic substance whose light absorption varies with temperature over a first wavelength range and remains substantially constant with temperature over a second wavelength range, and in that the electro-optical means responds to light transmitted through the thermochromic substance and through the optical fiber to detect the absorption of the first wavelength range relative to the second wavelength range, and to produce a signal indicative of the said relative absorption.

The invention exploits the known phenomenon of photochromism, that is the property of a substance whereby its optical absorption spectrum varies as a function of its temperature.

A method according to the invention of measuring temperature with a probe is characterized by transmitting light through a thermochromic substance within the probe and detecting the relative absorption of the light therein in two discrete wavebands, in only one of which the substance exhibits a thermochromic effect.

BRIEF DESCRIPTION OF THE DRAWINGS

The invention will be better understood from the following description of a preferred embodiment, by way of example only, with reference to the accompanying schematic drawings, in which.

DESCRIPTION OF THE PREFERRED EMBODIMENT

Figure 1:
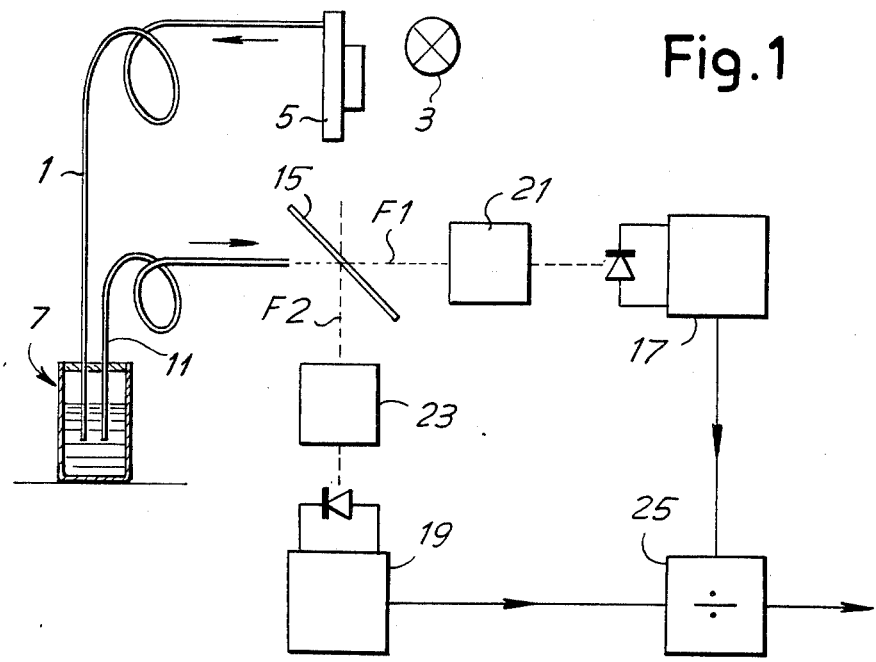
FIG. 1 is a diagram of a fiber-optic thermometer.
Figure 2:
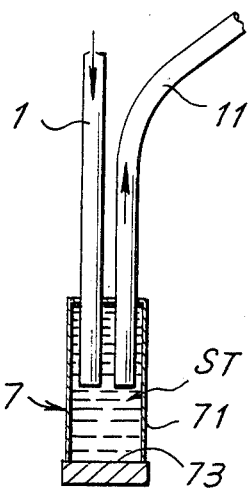
FIG. 2 shows a possible construction of the temperature sensor of the thermometer of FIG. 1.
Figure 3:
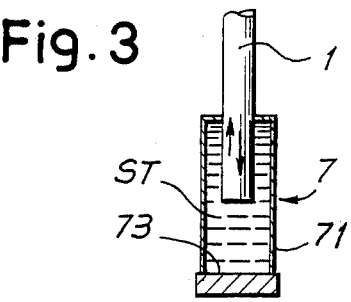
FIG. 3 shows a temperature sensor and beam divider of an alternative form of thermometer.

As shown in FIG. 1, a thermometer has an optical fiber 1 which carries light through a chopper 5 from a light source 3, such as a wide band source like a halogen lamp, or two sources (LED's) of different wavelengths, or lamps with linear emission. The light from chopper 5 goes right into the inside of a probe 7 containing a liquid thermochromic solution. The light may be of any suitable wavelength, not necessarily visible. The probe 7 may be made, for example, using a capillary of glass 71 (FIG. 2) or other material with a diameter of the order of 1 to 2 mm, sealed and made specular at its end part 73 opposite the input of the optical fiber, and containing the thermochromic solution ST. The light, attenuated by the solution ST and reflected by the end part 73, is collected by another fiber 11 (FIG. 2) and despatched to a beamsplitter 15 from which two beams F1 and F2 emerge. Alternatively, the light, attenuated by the solution ST and reflected by the end part 73, is taken on another optical pathway by the same fiber 1 (FIG. 3), and, through a star coupler 16 (or other divider), divided into two beams F1 and F2 issuing from fibers 12 and 13. The two beams F1 and F2 are sent to respective photodetectors 17 and 19, which are photodiodes or similar devices, after having been filtered at two separate and specific wavelengths by respective filters 21 and 23 of different values. The values obtained from the two detectors 17 and 19 are despatched to a processor 25 which compares them, and which advantageously processes them to supply directly a value representative of the measured temperature.

Figure 4:
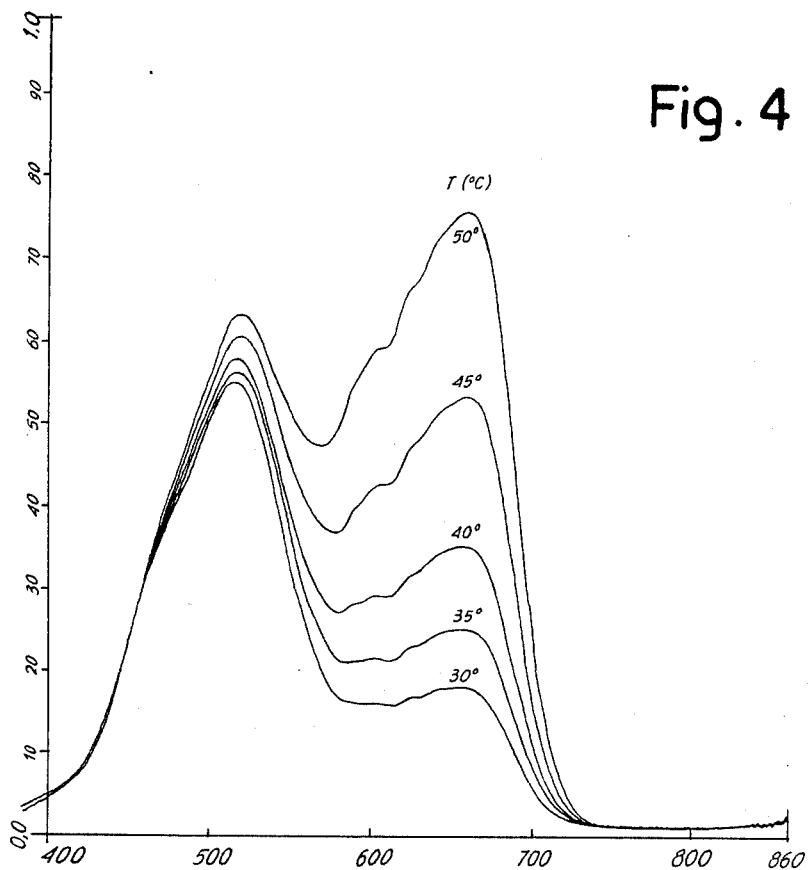
FIG. 4 is an absorption diagram as a function of wavelength of light transmitted through a thermochromic substance used in the thermometers of FIG. 1 or 3.

Depending on the temperature range concerned, the type of solution, and correspondingly the wavelengths selected by two filters, are chosen accordingly. For the temperature range of interest in biomedicine (from 30° C. to 50° C.) it is appropriate to use a solution of cobalt halides ($CoCl_2.6H_2O$) in a mixture of isopropyl alcohol and water. The absorption spectra of such a solution are given in FIG. 4 where the graphs are plotted with wavelength in nanometers along the abscissae and absorption (unity signifying total absorption) along the ordinates, each graph corresponding to a different temperature. In the range 740 to 850 nm, light absorption by the solution remains constant as temperature changes, while the greatest variation with temperature occurs around the absorption peak of 660 nm. In the case analysed, the two filters 21, 23 which are narrow-band interferometers are selected to transmit respectively a first band centered on the absorption peak (measurement, channel), and a second band centered on a wavelength within the range 740 to 850 nm (reference channel). With a view to eliminating the influence of the fluctuations common to the two channels a calculation is made of the ratio between the detected signals relating to the two channels. The measurements are thus independent, in particular, of any fluctuations of the source 3 and of the losses through the curvature of the optical fibers.

The signal provided by the processor 25 is subsequently processed and displayed.

Figure 5:
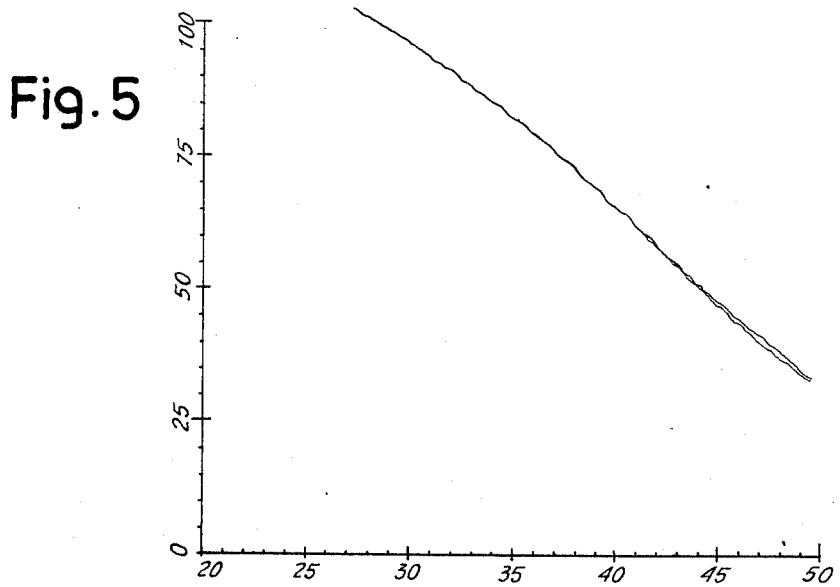
FIG. 5 is a graph showing the relationship between the thermometer output and the temperature being measured, for the thermometers of FIGS. 1 and 3.

The response of the thermometer constructed is shown in FIG. 5 which is a graph of reference temperature along the abscissa, against the resulting ratio, along the ordinate. The processing done by the processor 25 optionally corrects for the slight non-linearity of the response, using conventional calibration methods.

Because of the possibility of using several probes employing thermochromic substances different from cobalt halides, the thermometer under consideration may cover a fairly wide temperature range to suit various applications, such as the monitoring of electric, electronic or mechanical equipment, microwave ovens, etc.

By virtue of the reduced dimensions to which the thermometer may be made, it is suitable also for medical applications, such as e.g. measuring blood temperature inside arteries or hyperthermia of various natures. In the case of medical applications in particular it is necessary to make as miniaturized a probe as possible, to be able to take local temperature measurements and to limit trauma in the body.

What is claimed is:

1. In an optical fiber thermometer having an end probe and an optical fiber for conveying light from a source to the end probe and thence to electro-optical means for detecting temperature; the end probe contains a liquid thermochromic substance whose light absorption varies with temperature over a first wavelength range and remains substantially constant with temperature over a second wavelength range; the electro-optical means responding to light transmitted through the thermochromic substance and through the optical fiber to detect the absorption of the first wavelength range relative to the second wavelength range, and to produce a signal indicative of said relative absorption; a light source for producing light in both the first and second wavelength ranges; the electro-optical means splitting said transmitted light into two beams and comprising first and second narrow band-pass filters centered on the first and second wavelength ranges respectively, receiving respective ones of the two beams; first and second photodetectors responsive respectively to outputs of the band-pass filters to produce signals representative of the absorption in the respective wavebands; and processor means responsive to said absorption signals to produce said relative absorption signal which is indicative of the temperature sensed by the end probe; the end probe comprising a specular reflector part which reflects light of both said wavelength ranges, and wherein light from the optical fiber is transmitted through the liquid thermochromic substance, is reflected in the specular reflector part, is transmitted again through the thermochromic substance and is then conveyed to the electro-optical means by a further optical fiber; and the end probe further comprising a capillary tube containing the liquid thermochromic substance and which receives the ends of said optical fiber and of the end of a further optical fiber for conveying light to the electro-optical means, the ends of the optical fibers being immersed in the liquid substance.

2. A thermometer according to claim 1, wherein the thermochromic substance is a salt solution.

3. A thermometer according to claim 2, wherein the thermochromic substance is cobalt chloride in isopropyl alcohol, and the thermometer is adapted for the temperature range between 25° C. and 60° C.

4. In an optical fiber thermometer having an end probe and an optical fiber for conveying light from a source to the end probe and thence to electro-optical means for detecting temperature: the end probe contains a liquid thermochromic substance whose light absorption varies with temperature over a first wavelength range and remains substantially constant with temperature over a second wavelength range; the electro-optical means responding to light transmitted through the thermochromic substance and through the optical fiber to detect the absorption of the first wavelength range relative to the second wavelength range, and to produce a signal indicative of said relative absorption; a light source for producing light in both the first and second wavelength ranges; the electro-optical means splitting said transmitted light into two beams and comprising first and second narrow band-pass filters centered on the first and second wavelength ranges respectively, receiving respective ones of the two beams; first and second photodetectors responsive respectively to outputs of the bandpass filters to produce signals representative of the absorption in the respective wavebands; and processor means responsive to said absorption signals to produce said relative absorption signal which is indicative of the temperature sensed by the end probe; the end probe comprising a specular reflector part which reflects light of both said wavelength ranges, and wherein light from the optical fiber is transmitted through the liquid thermochromic substance, is reflected in the specular reflector part, is transmitted again through the thermochromic substance and is then conveyed to the electro-optical means by a further optical fiber; and the electro-optical means comprises a star coupler having an input fiber for connection to the source, and two output fibers for conveying transmitted light to respective band-pass filters, and connected by said optical fiber to the end probe to convey light to and from the end probe; said end probe further comprising a capillary tube containing the liquid substance and which receives the end of the optical fiber, the end of the optical fiber being immersed in the liquid substance.

5. A thermometer according to claim 4, wherein the thermochromatic substance is a salt solution.

6. A thermometer according to claim 5, wherein the thermochromic substance is cobalt chloride in isopropyl alcohol, and the thermometer is adapted for the temperature range between 25° C. and 60° C.

7. An optical thermometer comprising:
   a light source for producing first and second discrete wavelengths of light;
   a first optical fiber for conveying the first and second wavelengths of light from said light source, said first fiber having an end spaced away from said light source;
   a capillary tube defining a closed space with a bottom, said end of said first fiber extending into said space and facing said bottom;
   a reflecting element at said bottom of said capillary tube for reflecting the first and second wavelengths of light;
   a liquid thermochromic salt solution in said capillary tube filling said space at least sufficiently to immerse said end of said first optical fiber so that light from said fiber passes through said solution and is reflected by said reflecting element back into said solution;

optical pathway means having one end disposed in said capillary tube and immersed in said solution facing said bottom of said capillary tube and facing said reflecting element for receiving light reflected from said reflecting element, at an opposite end, said optical pathway means functioning to conduct both wavelengths of light reflected from said reflecting element to said opposite end of said optical pathway means; and electro-optical means connected to said opposite end of said optical pathway means for receiving both wavelengths of light, said electro-optical means including means for splitting the reflected light into two beams corresponding to the two ranges of light, first and second narrow band-filters centered on each of the beams of light, first and second photodetectors connected at an output of each of said first and second filters respectively and processor means for receiving light from said first and second filters for producing a relative absorption signal for the light which passed through said solution and is indicative of the temperature sensed by the end probe.

8. An optical thermometer according to claim 7, wherein said means for splitting the light comprises a star coupler having two output fibers each extending to one of said first and second filters, and an input fiber comprising said first optical fiber, with a further optical fiber extending from said spar coupler into said solution which carries said end of said first optical fiber and, at the same time, forms said one end of said optical pathway means.

9. An optical thermometer according to claim 7, wherein said optical pathway means comprises a second optical fiber having a first end immersed in said solution and facing said reflecting element, and an opposite end, said means for splitting light comprising a beam splitter hacing said optical end of said second optical fiber for receiving light therefrom.

* * * * *